United States Patent [19]
Schmidt et al.

[11] Patent Number: 5,906,254
[45] Date of Patent: May 25, 1999

[54] ACTIVE SYSTEMS AND DEVICES INCLUDING ACTIVE VIBRATION ABSORBERS (AVAS)

[75] Inventors: Warren E. Schmidt, Erie, Pa.; Douglas E. Ivers, Cary, N.C.; Mark R. Jolly, Holly Springs, N.C.; Mark A. Norris, Apex, N.C.

[73] Assignee: Lord Corporation, Cary, N.C.

[21] Appl. No.: 08/793,029

[22] PCT Filed: Oct. 11, 1995

[86] PCT No.: PCT/US95/13610

§ 371 Date: Feb. 3, 1997

§ 102(e) Date: Feb. 3, 1997

[87] PCT Pub. No.: WO96/12121

PCT Pub. Date: Apr. 25, 1996

Related U.S. Application Data

[63] Continuation-in-part of application No. 08/322,123, Oct. 12, 1994, abandoned.

[51] Int. Cl.⁶ .................................................. F16F 7/10
[52] U.S. Cl. ................... 188/378; 267/136; 267/140.14
[58] Field of Search ..................... 188/378, 379, 188/380, 267, 267.1, 267.2, 266.7; 267/136, 140.14, 140.15; 248/550; 244/54, 17.27, 17.11; 381/71.1, 71.2; 180/300, 312, 902; 52/167.1, 167.7, 167.2; 416/134 A, 134 R, 500

[56] References Cited

U.S. PATENT DOCUMENTS

| | | | |
|---|---|---|---|
| 3,088,062 | 4/1963 | Hudimac | 318/128 |
| 3,487,888 | 1/1970 | Adams et al. | 181/33 |
| 3,490,556 | 1/1970 | Bennett, Jr. et al. | 181/33 |
| 4,083,433 | 4/1978 | Geohegan, Jr. et al. | 188/1 B |
| 4,432,441 | 2/1984 | Kurokawa | 188/267 |
| 4,565,940 | 1/1986 | Hubbard, Jr. | 310/326 |
| 4,610,420 | 9/1986 | Fukushima et al. | 248/550 |
| 4,635,892 | 1/1987 | Baker | 248/550 |

(List continued on next page.)

FOREIGN PATENT DOCUMENTS

| | | |
|---|---|---|
| 0 554 057 A1 | 8/1993 | European Pat. Off. . |
| 2447776 | 8/1980 | France . |
| 2705416 | 11/1994 | France . |
| 58-74931 | 5/1983 | Japan . |
| 62-288743 | 12/1987 | Japan . |
| WO 88/05506 | 7/1988 | WIPO . |
| WO 92/02382 | 2/1992 | WIPO . |
| WO 96/12121 | 4/1996 | WIPO . |

OTHER PUBLICATIONS

"Operating Guide for the Series 710 Piezoelectric Actuator" Instruction manual from AVC Instrumentation.

White, et al. "An Adaptive Controller for Multivariable Active Noise Control"; *Applied Acoustics*, 17(1984); pp. 99–109.

Nishimura et al.; *An Intelligent Tuned Mass Damper*, American Institute of Aeronautics and Astronautics, Inc., A1AA–93–1709–CP:3561–3569 (1993).

*Primary Examiner*—Douglas C. Butler
*Attorney, Agent, or Firm*—Randall S. Wayland

[57] ABSTRACT

A flexibly-mounted active vibration absorber (AVA) which has a secondary controllable mass $M_3$. If the passive resonance of mass $M_2$ of the tuned absorber is insufficient to control the input vibration, a secondary mass $M_3$ is vibrated at a frequency, amplitude and phase sufficient to make up the deficiency in mass $M_2$. Many embodiments are described which depict variations on the first spring used for flexibly mounting the AVA, the actuators used to drive the AVA, and the attachment features for attaching to a vibrating member. Further in another aspect, means for counterbalancing the moments produced by the AVA are described.

27 Claims, 8 Drawing Sheets

U.S. PATENT DOCUMENTS

| | | | |
|---|---|---|---|
| 4,693,217 | 9/1987 | Beer | 123/195 A |
| 4,715,559 | 12/1987 | Fuller | 244/1 N |
| 4,819,182 | 4/1989 | King et al. | 364/508 |
| 4,940,914 | 7/1990 | Mizuno et al. | 310/326 |
| 5,251,863 | 10/1993 | Gossman et al. | 248/550 |
| 5,265,704 | 11/1993 | Landesfeind | 188/378 |
| 5,275,388 | 1/1994 | Kobayashi et al. | 267/140.14 |
| 5,310,137 | 5/1994 | Yoerkie, Jr. et al. | 244/17.27 |
| 5,337,864 | 8/1994 | Sjöstrom | 188/378 |
| 5,427,362 | 6/1995 | Schilling et al. | 267/140.14 |
| 5,431,261 | 7/1995 | Olgac | 188/379 |
| 5,433,422 | 7/1995 | Ross et al. | 267/140.15 |
| 5,439,082 | 8/1995 | McKeown et al. | 188/379 |
| 5,447,001 | 9/1995 | Nishimura et al. | 52/167.2 |
| 5,505,282 | 4/1996 | Olgac | 188/379 |
| 5,509,641 | 4/1996 | Prinzler et al. | 267/64.19 |
| 5,518,108 | 5/1996 | Spurlin | 198/769 |
| 5,529,295 | 6/1996 | Leibach et al. | 267/140.15 |

ACTIVE SYSTEMS AND DEVICES INCLUDING ACTIVE VIBRATION ABSORBERS (AVAS)

This application is a 371 of PCT/US95/13610 filed Oct. 11, 1995 which is a continuation-in-part of U.S application Ser. No. 08/322,123 filed on Oct. 12, 1994, now abandoned.

BACKGROUND AND SUMMARY OF THE INVENTION

The present invention is directed to active structural vibration control. More particularly, this invention is a flexibly-mounted Active Vibration Absorber (AVA).

In the realm of active noise and vibration control, there are three implementation approaches: active noise control, which uses an inverse-phase sound wave to cancel the disturbance signal; active structural control, which vibrates a structural component at a frequency to cancel the input disturbance (noise and/or vibration); and active isolation control, where an actuator in a mount is reciprocated at the proper frequency, phase and amplitude to cancel the input disturbance (which, again, may be a structural vibration or in the audible range, in which case it is experienced as noise). The active tuned AVA falls in the category of active structural control.

Tuned vibration absorbers are known. These are generally passive systems in which the mass $M_2$ is chosen to resonate at or near the primary frequency of interest, e.g., the blade pass frequency of a helicopter rotor. The problem with such passive absorber systems has been that the weight penalty paid for their usage was not justified by the level of improvement in performance. Further, the performance was limited by the fact that once the mass was chosen, its effectiveness was restricted to optimization at a single frequency. The system was unable to adapt to changing conditions in order to cancel other frequencies.

The present invention enhances the performance of an active tuned absorber by flexibly-mounting the AVA. Multiple embodiments are shown for shaping the output spectrum of the AVA by various embodiments of flexible-mountings. Further, in another aspect, means for counterbalancing the flexibly-mounted AVA are described.

Various other features, advantages and characteristics will become apparent after a reading of the following specification.

BRIEF DESCRIPTION OF THE DRAWINGS

The accompanying drawings which form a part of the specification, illustrate several key embodiments of the present invention. The drawings and description together, serve to fully explain the invention. In the drawings.

FIG. 19b is a partially cross-sectioned top view of the flexibly-mounted active vibration absorber system of FIG. 19a;

DETAILED DESCRIPTION OF THE PREFERRED EMBODIMENTS

Figure 1:
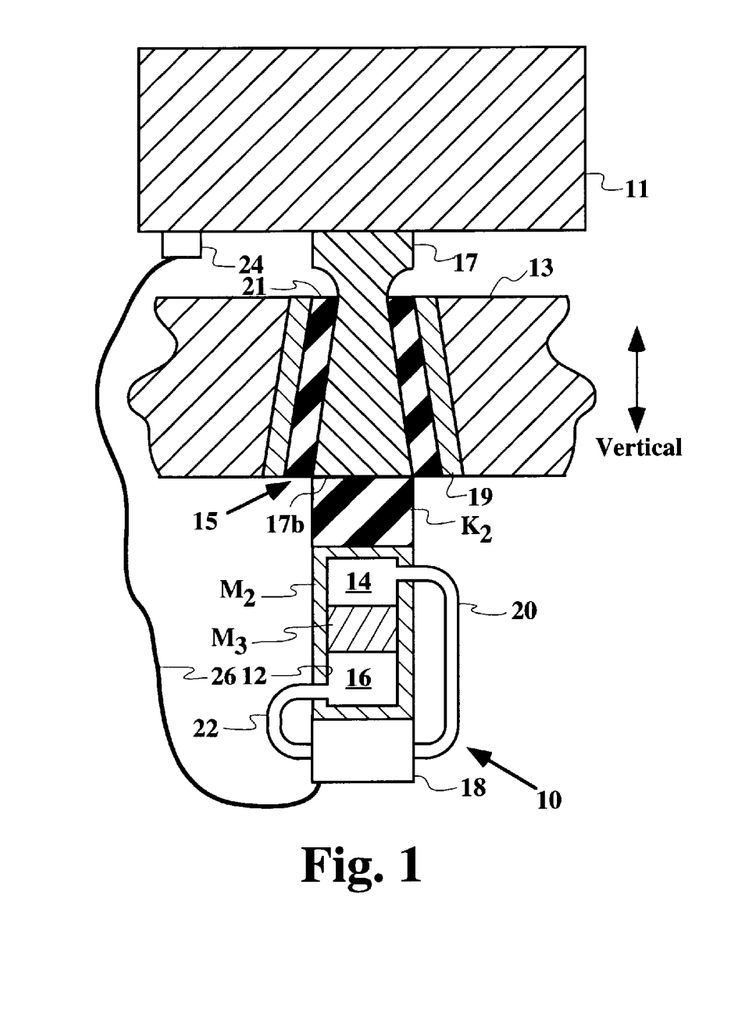
FIG. 1 is a cross-sectional side view of a schematic depiction of a first hydraulic embodiment of the active vibration absorber of the present invention.

A schematic depiction of a first embodiment of the active vibration absorber (AVA) of the present invention is shown in FIG. 1 generally at 10. It should be noted that like numerals have been used throughout the various embodiments to denote like elements. A vibrating member 11, which may, for example, be the main power plant/rotor system or transmission of a helicopter having a mass $m_1$, is attached to support structure 13, such as a helicopter fuselage, by a passive mount 15 including an inner member 17, an outer member 19 (which is preferably a separate member), and a flexible element 21 bonded to both said inner (17) and outer (19) members. Flexible element 21 is preferably soft, having a vertical spring rate kl, for example, in the range of between about 10,000 lb./in. and 50,000 lb./in. While it is preferred that the flexible element 21 be soft, it is not essential to the performance of the present invention; in fact, the vertical spring rate could be on the order of 300,000 lb./in. Softness of the flexible element 21 may enhance isolation between vibrating member 11 and support structure 13 by reducing residual vibrational forces, if any, which might be transmitted through flexible element 21 resulting in shaking of the structure 13. However, for some applications, the flexible element 21 might be omitted altogether.

A first spring $K_2$ having a spring rate of $k_2$ is connected to one of the inner member 17, outer member 19, and support structure 13, depicted here as connected to the base 17b of inner member 17. An active actuation means comprised of first mass $M_2$ having mass $m_2$ is bonded to the distal end of spring $K_2$. Within, or adjacent, the mass $M_2$, is a second mass $M_3$ having mass $m_3$, which can slide upwardly and downwardly, as depicted in FIG. 1, in chamber 12, or left and right, or in all four directions if appropriately mounted. Chamber 12 is subdivided into an upper chamber 14 and a lower chamber 16 by second mass $m_3$. A controller 18 includes a spool valve and controller electronics in this embodiment. The spool valve is connected to upper (14) and lower (16) chambers by tracks 20 and 22 respectively. A sensor 24 feeds a signal through cable 26 to controller 18. Sensor 24 will feed a signal indicative of the vibrational frequency of vibrating member 11 to controller 18 which will cause second mass $M_3$ to vibrate at the corresponding frequency needed to diminish, or preferably cancel, the vibration of member 11. If the oscillation of mass $M_3$ is unable to cancel out the vibration, the use of a soft element 21 can minimize vibrations transmitted to the support structure 13. However, it should be noted that it may be desired to drive a local point with the flexibly-mounted AVA to cause a reduction in noise or vibration at a remote location.

The present invention improves upon a conventional passive Tuned Vibration Absorber (TVA) in two ways. First, since mass $M_3$ can be vibrated at a variety of frequencies, the AVA 10 is better able to adapt to varying conditions and to cancel more than a single frequency. Second, since mass $M_3$ has this capacity to magnify the effective mass of $M_2$, particularly when operating at or near resonance, then the mass $m_2$ of $M_2$ need not be as large as in the case of a passive TVA. Furthermore, prior active vibration absorbers have attached directly to the structure. The addition of the spring $K_2$ allows the absorber mass to be smaller. The absorber mass $M_2$ and its resonance are tuned at or near the frequency of interest, but may also be tuned elsewhere as will be described later. Accordingly, the weight penalty associated With the AVA 10 of the present invention is not as great as with its passive TVA counterpart.

Figure 3:
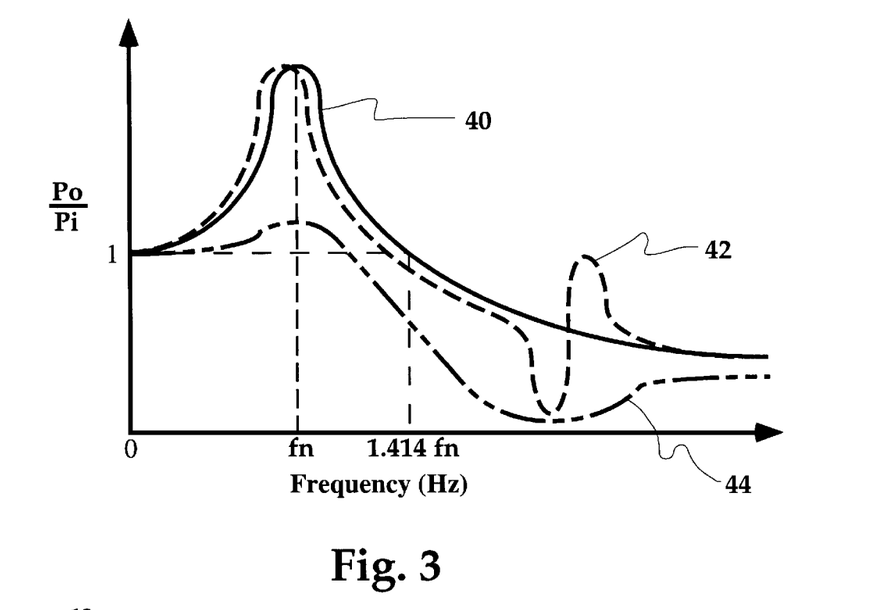
FIG. 3 is a plot of hypothesized transmissibility curves for passive and active vibration absorber systems.
Figures 4A, 4B:
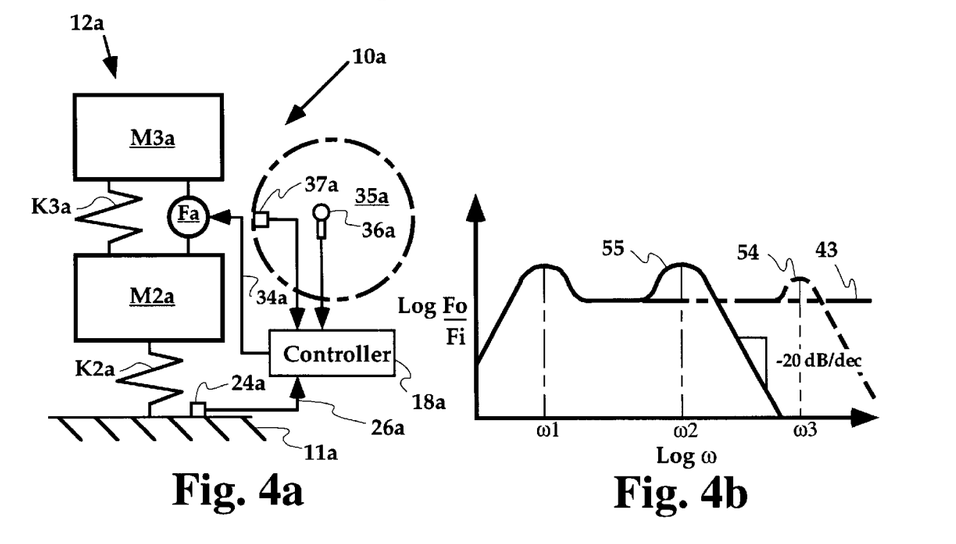
FIG. 4a is a side schematic view of the flexibly-mounted active vibration absorber system for controlling noise and/or vibration at a predefined location.
FIG. 4b is a plot of hypothesized force transfer function for a theoretically ideal AVA, a real-world AVA, and a flexibly-mounted AVA.

The improved performance capability of the active tuned absorber of the present invention is schematically depicted in FIG. 3 and FIG. 4b. The transmissibility curve of a typical passive elastomeric mount is shown in the solid line 40. The dotted line 42 shows the anticipated performance of a system with a passive elastomeric mount and a passive tuned vibration absorber (TVA), while the double dashed line 44 indicates the anticipated performance of the passive elastomeric mount with a flexibly-mounted active vibration absorber (AVA) of the present invention. As suggested by the curves, the AVA should out-perform the conventional passive mount system and the system including a passive tuned vibration absorber (TVA) throughout the frequency range of interest. Not only can the transmissibility at resonance of the main system be reduced, but the effective range of the absorber can be increased as compared to the passive version. Further, the penalty paid beyond the resonant frequency of the system incorporating a passive absorber can be eliminated (note the portion of curve 42 extending above solid line 40.)

Figure 2:
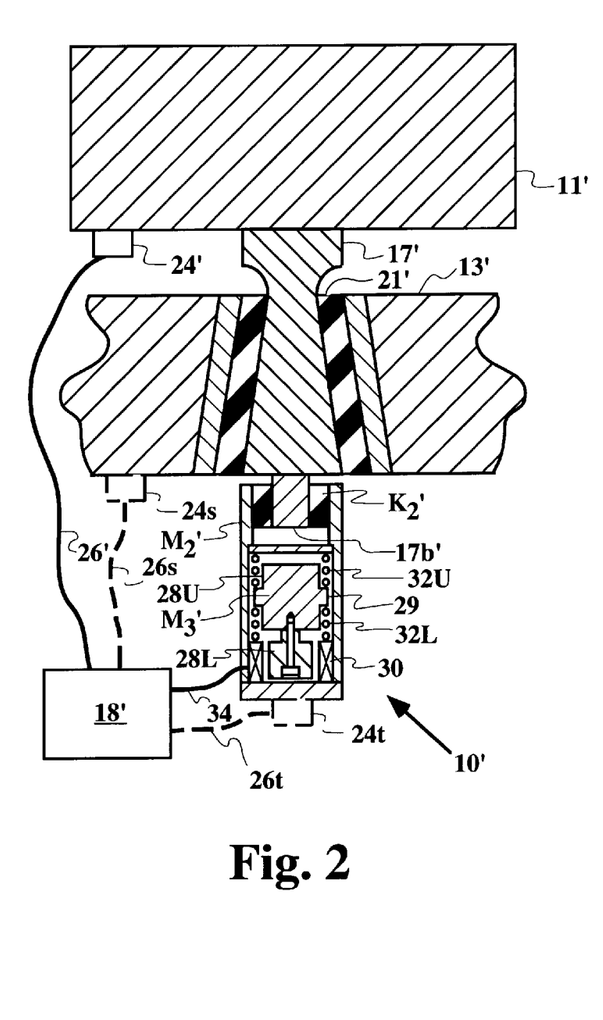
FIG. 2 is a cross-sectional side view of a schematic depiction of a second electromagnetic embodiment of the active vibration absorber.

A second embodiment of the present invention is depicted in FIG. 2 generally at 10'. In this embodiment, first spring $K_2'$ is depicted as operating in shear rather than compression. For this purpose, the base 17b' of inner member 17' is formed with a stem which is preferably bonded to and received within spring $K_2'$ which is formed as an annulus. Furthermore, movable mass $M_3'$ is the core of a voice coil 30. Portion 28L of the core is magnetic while portion 28U need not be. Portion 28U has a circumferential protruding flange 29 which is engaged by centering springs 32U and 32L to return the core to a neutral position when no current is flowing in coil 30. In addition to sensor 24' positioned on member 11', secondary (24s) and tertiary (24t) sensors may be positioned on support structure 13' and on active actuation means $M_2'$, respectively. The signals indicative of at least one of the displacement, velocity or acceleration of these components of the system are fed to controller 18' via cables 26', 26s and 26t, respectively. Comparison of these signals will permit the relative movements of these respective elements to be determined and for the optimal control to be effected through electrical conduit 34. Ordinarily, optimal control will involve minimizing the movement of support structure 13', but specialized circumstances may dictate an alternative control theory whereby motion of member 11' may be minimized, or sound or vibration may be minimized at a remote location.

As in the previous embodiment, active actuation means $M_2'$ will be vibrated at a frequency w', by alternating the current and thereby reversing the polarity of the magnetic field induced within coil 30, to cancel vibrational input from vibrating member 11'. In a conventional system employing only a passive elastomeric mount, a static input force $P_i$ will produce a vibrating body having a vibrational amplitude described by the expression $X_i$ Sin wt, where $X_i$ is the maximum displacement produced by the input force $P_i$ and w is the excitation frequency of the input. In the design phase, the natural frequency $w_2$ of the AVA is preferably equated to the most likely input disturbance frequency w by selecting appropriately the spring constant $k_2$ of spring $K_2$ and $m_2$ of first mass $M_2$ since $w_2=\sqrt{k_2/m_2}$. Therefore, for the likely normal operation, $M_2$ will function as a tuned vibration absorber supplying a force $F_2$, which adds to the inertia force $m_1 \ddot{X}$ to oppose $P_i$ Sin wt.

If this additive force is insufficient to counter the vibration of member 11', either because the excitation frequency is not equal to the natural frequency of the tuned mass or because the $P_i$ excitation is too large, the sensor 24' will activate oscillation of the second mass $M_3'$ which will magnify the amplitude of vibration of first mass $M_2'$ at the required phase, frequency and magnitude to reduce or eliminate the input vibration from member 11'. For any motions not canceled, flexible element 21' will minimize transmitted forces because of the soft spring constant $k_1$. This is true for all cases where $w_1$ which equals $\sqrt{k_1/m_1}$ is less than 70% of the excitation frequency w (hence the desire for the soft spring).

FIG. 4a illustrates an active system 10a including an AVA 12a which is flexibly mounted to a vibrating member 11a. The AVA 12a interconnects to vibrating member 11a in an attempt to control a level of vibration and/or sound at a predefined location, such as in the remote location of closed volume 35a shown. By the term control a level of vibration and/or sound, it is envisioned that the locally, vibration may be reduced or, in some applications, may be locally increased (driven) to reduce a level of sound or vibration at a remote location. Generally, the vibrating member 11a is connected structurally, in some fashion, to the closed volume 35a. For example, the closed space could be an aircraft cabin and the vibrating member 11a could be the structure vibrated by an unbalance in the aircraft engine. In this scenario, the AVA 12a would attach to the structure in the vicinity of the engine or, for example, to the inner member of a passive mount in the fashion described later herein. Vibration of the structure, such as caused by an unbalance in the engine, causes unwanted noise to be generated in the aircraft cabin. The flexibly-mounted AVA 12a can be driven at the structure to reduce this unwanted noise. Furthermore, it should be recognized that the vibrating member 11a could be the fuselage walls themselves and the AVA 12a would then be mounted directly to the fuselage walls or to stiffening members (ribs, stringers or frames) as will be described later.

The active system 10a comprises, in one novel aspect, a first spring K2a for flexibly mounting the AVA 12a to the vibrating member 11a. The AVA 12a is interconnected to, and freely suspended by said first spring K2a. The first spring K2a soft-mounts (flexibly or resiliently mounts) the AVA 12a. Further, it should be understood that the first spring K2a can be used to shape the output spectrum of the AVA 12a. For instance, a level of damping, such as hysteretic or viscous, may be added to reduce the transmissibility at the resonant peaks. Moreover, the springs and masses of the system may be varied to shape the frequency response of the AVA 12a and to attenuate transmission of unwanted high frequency harmonics or noise caused by activation of the AVA 12a.

AVA 12a includes, in addition to first free-floating mass M2a attached to the first spring K2a, a second free-floating mass M3a, which is adjacent said first free floating mass M2a, and a second spring K3a interconnected between mass M2a and said second mass M3a. An actuator Fa also interconnects said first mass M2a and said second mass M3a and is arranged in parallel relationship to said second spring K3a to generate active real-time positive and negative forces to oscillate, in real-time, said second free-floating mass M3a relative to said first free-floating mass M2a.

Figure 6A:
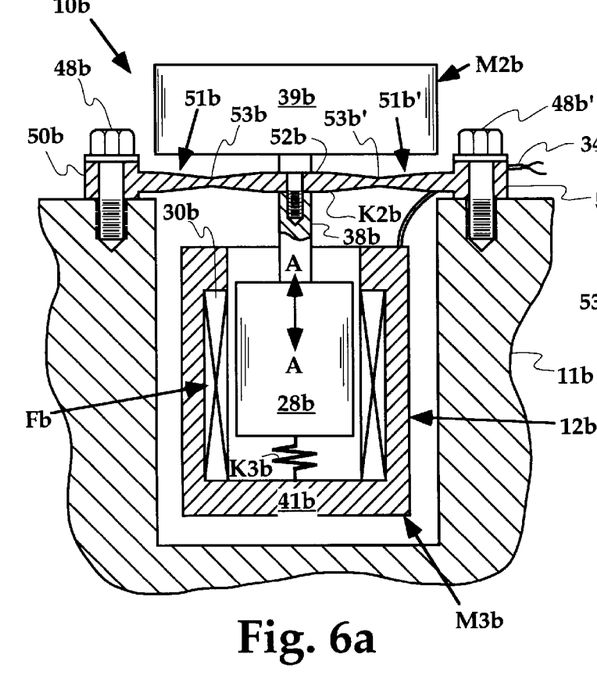
FIG. 6a is a partially cross-sectioned side view of a flexibly-mounted active vibration absorber system where the first spring K2b is comprised of flexible beam-like elements manufactured from a spring-steel material.

The mass M2a may be the case mass of the AVA or it may be a combination of the case mass, attachment brackets and auxiliary tuning mass (see FIG. 6a). It should be noted, that the first free-floating mass M2a and the first spring K2a may be tuned to provide a tuned resonant frequency which may coincide with the operating frequency of the disturbance, if desired. This makes the AVA 12a more effective. Furthermore, if there are multiple disturbance frequencies, such as in most aircraft applications, a system resonant frequency may be tuned to an intermediate frequency such that the power required to actuate the AVA 12a at both frequencies is lessened. For example, in systems having both 4 per rev and 8 per rev disturbances of substantially equal magnitude, the second resonance of the system may be tuned to be located between those two frequencies. This is another way that tuning of first spring K2a may be used to shape the output of the AVA 12a. Furthermore, it may be equally desirable to tune the resonances (FIG. 4b) of the flexibly mounted AVA 12a by adjusting the first free-floating mass M2a, second free-floating mass M3a, and/or the springs K2a and K3a, such that the first resonance substantially coincides with the 4 per rev disturbance frequency and such that the second resonance substantially coincides with the 8 per rev disturbance frequency. The 4 per rev and 8 per rev disturbance frequencies may result from a fundamental rotational disturbance frequency and a harmonic thereof as produced in a 4-bladed turbo-prop aircraft.

The active system 10a also includes a controller 18a, preferably including a CPU and memory, for sending a control signal through conduit 34a to actively activate actuator Fa. Activating actuator Fa will, in turn, drive second free-floating mass M3a relative to first free-floating mass M2a. Sensor 24a delivers a signal through cable 26a which is indicative of the vibration at the attachment point of the AVA 12a to the vibrating member 11a. Further, a sensor may be located at some other remote point which is dynamically connected to the attachment point and where vibration is desired to be controlled. An algorithm may be used, such as Least Mean Square (LMS) to control the vibration at that local point or at a remote location. Furthermore, an error sensor 36a may be used to derive a signal indicative of the residual noise in a closed volume 35a.

A reference signal indicative of the frequency and phase of the disturbance is usually required for most control methods. A control method such as LMS may be used for both noise or vibration control. A simple closed loop control, if desired, may be used for cost-driven vibration control applications. For systems where the AVA 12a is flexibly mounted to the perimeter of the closed volume 35a, such as when attached to stiffening members of an aircraft fuselage, it may be desired to reduce noise in the cabin caused by vibration of the perimeter of the closed space 35a. The term stiffening members includes ribs, stringers, frames and the like. Sensor 37a may then be used to derive a signal indicative of the vibration disturbance to be used as an input signal or an error signal, depending on what is to be controlled.

FIG. 4b illustrates how the transfer function from AVA 12a may be shaped by addition of first spring K2a and first free-floating mass M2a. Curve 43 (double-dotted line) illustrates a theoretically perfect AVA having no internal resonances (noise) other then the primary resonance of M3a at frequency ω1. Fo is the output of the flexibly-mounted AVA 12a, as would be measured by a force sensor attached between first spring K2a and vibrating member 11a. Fi would be the output force of actuator Fa. Curve 54 (single-dotted line) shows a real-world device where there is some other high-frequency resonance, such as due to electrical resonances in the AVA, system electronics, and the like. This high frequency resonance at frequency ω3 may amplify higher-frequency noise in the system and is generally undesirable. Yet, in prior art systems, amplification of high-frequency noise, if present, was unavoidable.

Adding first spring K2a and first free-floating mass M2a adds another resonance at frequency ω2 to the system. Beyond resonance frequency ω2, there is a roll-off of about 20 dB per decade. Therefore, high-frequency noise generated by the AVA 12a or driving electronics is substantially attenuated above frequency ω2, as compared to the prior art system where the AVA 12a was hard-mounted to the vibrating member 11a. It should also be noted, that most control implementations have an unwanted high-frequency step component as a result of their digital implementation. Also, slight non-linearities in the AVA 12a or system will cause unwanted higher frequency harmonics. Adding and tuning the first spring K2a and the first free-floating mass M2a can be used to shape the output spectrum of the AVA 12a such that this unwanted high-frequency noise is also attenuated above frequency ω2.

Curve 55 (solid line) illustrates an output force Fo of a flexibly-mounted AVA 12a as a function of frequency. Tuning either or both of the masses and stiffnesses can effect the position of resonances ω1 and ω2 relative to one another. The resonant frequencies ω1 and ω2 may be determined by calculating the system eigenvalues. In one aspect, the two resonances ω1 and ω2 can be made to nearly coincide, i.e., be tuned to nearly the same frequency. However, generally, it is required that first free-floating mass M2a be much greater in mass than second free-floating mass M3a for this to be practicable, i.e., M2a>>M3a or visa-versa. Furthermore, between the first resonance ω1 and the second resonance ω2 is defined the operating bandwidth of the AVA 12a. Adding first free-floating mass M2a and first spring K2a to the system allows tuning a narrower operating bandwidth that is advantageous for attenuating the high-frequency actuator noise and control noise mentioned before. Flexibly mounting the AVA 12a accomplishes this.

Figure 5A:
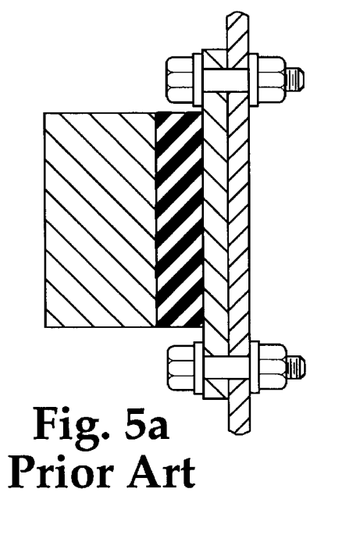
FIGS. 5a and 5b are cross-sectional side views of schematics of two prior art passive tuned absorber assemblies for reducing vibration of an aircraft stiffening member.
Figure 5B:
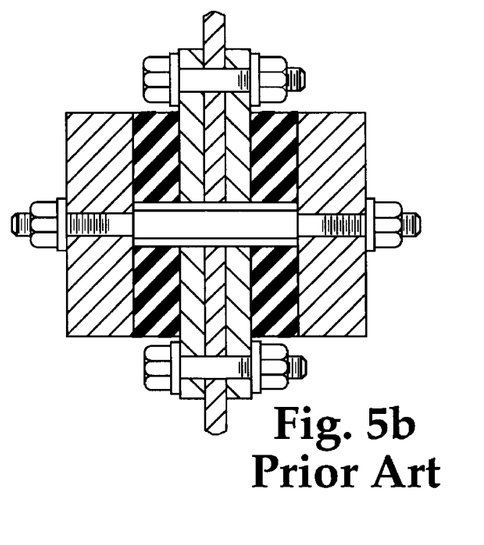

FIG. 5a and FIG. 5b illustrate prior art systems where it is known to attach passive TVAs to an aircraft stiffening member to reduce the localized level of vibration of the structure. As a result, the interior cabin noise may also be reduced. Systems using passive TVAs may reduce the interior noise level by as much as about 6 dB whereas higher levels of reduction may be achieved with flexibly mounted AVAs. Such passive TVAs are identified by LORD CORPORATION as P/N J-23091-3.

FIG. 6a illustrates an active device 10b for use in an active system for attachment directly to a vibrating member 11b. For clarity, the means for controlling the actuator Fb are not shown. The device 10b includes a first spring K2b which provides a flexible attachment between an AVA 12b and the vibrating member 11b. The AVA 12b is interconnected and freely suspended by the first spring K2b. The spring characteristics of first spring K2b may be altered to shape the output of the AVA 12b (FIG. 4b).

In this embodiment, the first spring K2b is comprised of multiple spring-steel beam-like elements which extend radially and perpendicularly outward from the axis of shaft 38b. Activation of AVA 12b along axis A—A generate forces which tend to control vibration of the vibrating member 11b at the attachment point.

Figure 6B:
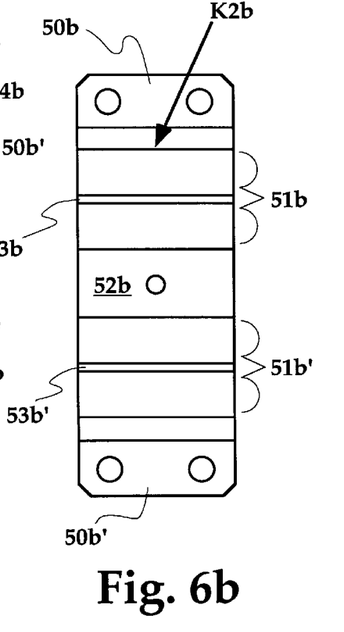
FIG. 6b is a top view of the first spring K2b which is comprised of multiple flexible beam-like elements.

FIG. 6b illustrates the first spring K2b including beam-like elements 51b and 51b', flanges 50b and 50b' for attachment to vibrating member 11b by bolts 48b and 48b', and center portion 52b for interconnection and attachment to the AVA 12b. Necked-down sections 53b and 53b' contribute to, and provide, a designed bending stiffness used to shape the output of the AVA 12b. Again referring to FIG. 6a, the AVA 12b includes a first free-floating mass M2b which, in this case, is made up of shaft 38b, detachable auxiliary mass 39b, magnet 28b, and a portion of the masses of springs K2b and K3b. It should be understood, that the mass of detachable auxiliary mass 39b may be adjusted to shape the output spectrum of the AVA 12b. The device 10b also includes a second free-floating mass M3b adjacent the first free-floating mass M2b which is made up of a case 41b, a coil 30b, a portion of spring K3b, and a portion of conduit 34b. Second spring K3b may be a coil spring, belleville spring, reed spring, or the like.

In operation, alternating electrical energization of coil 30b via conduit 34b produces an induced magnetic field that repels and interacts with the static magnetic field produced by magnet 28b to drive the second free-floating mass M3b relative to the first free-floating mass M2b. The control amplifies the already present resonance of the K2b–M2b system by actuating the K3b–M3b system, if needed. The actuator means Fb is a voice-coil type actuator in this embodiment, and operates between the masses M2b and M3b to provide active real-time forces to actively oscillate the masses M2b and M3b relative to one another. By the term operate, it is envisioned that a force will be exerted between the masses by some actuation means, such as an electromagnetic actuator, voice-coil type actuator, magnetostrictive actuator, piezoelectric actuator, or the like.

Figure 7:
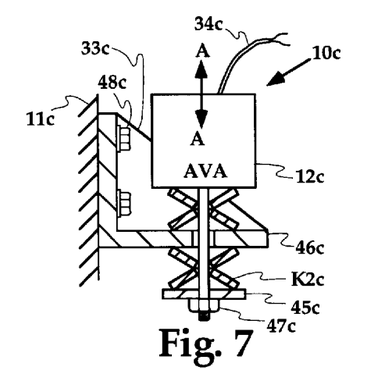
FIG. 7 is a side view in partial section of a flexibly-mounted active vibration absorber system where the first spring is comprised of multiple stacked belleville washers.

FIG. 7 illustrates another embodiment of flexibly-mounted AVA device 10c for use in an active system. With reference to FIG. 7 through FIG. 27, the controller and sensors are not shown for purposes of clarity. It should be understood, however, that all of these devices require some means for controlling the flexibly-mounted AVAs and require at least one sensor indicative of vibration and/or noise to be controlled. In most cases, it will be desirable to have both a reference signal and an error signal.

The AVA 12c is flexibly mounted to the vibrating member 11c by second spring K2c which is preferably comprised of multiple-stacked bellville washer springs which connect to bracket 46c by precompressing stacks of springs K2c with fastener 47c and washer 45c. Bracket 46c, which includes stiffening ribs 33c, interconnects and attaches the first spring K2c and AVA 12c to vibrating member 11c by bolts 48c. Conduit 34c receives the control signal from the controller (not shown) to drive the AVA. In each of FIGS. 7–16, 19–23, and 25–27 where an AVA is shown, the case mass acts as at least a portion of the first free-floating mass M2, an internal spring housed within the AVA acts as the second spring K3 and the internal mass, which may be a magnet, acts as the second free-floating mass M3.

Figure 8:
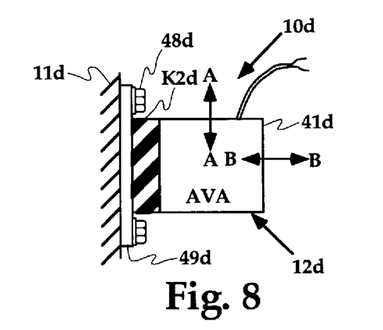
FIG. 8 is a side view of a flexibly-mounted active vibration absorber system where the first spring is comprised of a single sandwich-type elastomer element.

FIG. 8 illustrates another embodiment of device 10d for use in an active system where the first spring K2d is an elastomer shear element which is placed in substantially pure shear upon actuation of the AVA 12d along the axis A—A shown. Alternatively, the AVA 12d may be arranged such that the actuation is along axis B—B, in which case, the loading of spring K2d would be in substantially pure compression. In particular, the element is a sandwich-type elastomer section, as will be understood by those of ordinary skill in the art. The first spring K2d is preferably bonded directly to the case 41d of the AVA 12d and also to a plate 49d. Plate 49d attaches by way of bolts 48d to the vibrating member 11d. The stiffness and damping of the elastomer used can be adjusted to shape the output response of the AVA 12d.

Figure 9:
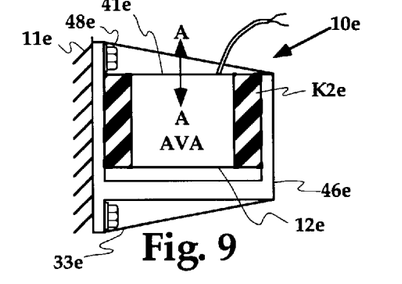
FIG. 9 is a side view of a flexibly-mounted active vibration absorber system where the first spring is comprised of multiple elastomer shear elements.

FIG. 9 illustrates another embodiment of device 10e for use in an active system wherein the first spring K2e includes multiple elastomer shear members which are preferably placed in substantially pure shear upon activation of the AVA 12e along the axis A—A shown. Again, the first spring K2e is preferably bonded directly to the case 41e of the AVA 12e and also to bracket 46e. Bracket 46e attaches by bolts 48e to the vibrating member 11e. Multiple elastomer shear members may be needed to increase the rotational stiffness of the flexibly-mounted AVA 12e and drive any rotational resonances above the disturbance frequency.

Figure 10:
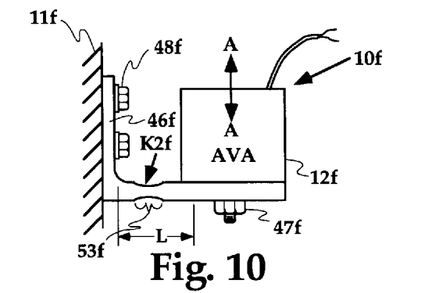
FIG. 10 is a side view of a flexibly-mounted active vibration absorber system where the first spring is comprised of a cantilever beam designed to have a specific bending stiffness.

FIG. 10 illustrates another embodiment of active device 10f for use in an active system wherein the first spring K2f is a cantilevered beam which is manufactured from spring-steel material and which is placed in bending upon activation of the AVA 12f along the axis A—A shown. The first spring K2f preferably includes an effective length L, a first end for attachment to said vibrating member 11f and a second terminal end. The AVA 12f is fastened to the first spring K2f near the terminal end. First spring K2f preferably also includes necked-down portion 53f for providing a designed bending stiffness. Bracket 46f attaches by bolts 48f to the vibrating member 11f, and AVA 12f attaches by fastener 47f to bracket 46f. Adjusting the length, width, modulus, and thickness of the cantilever beam section of first spring K2f can be used to shape the response of the AVA 12f.

Figure 11:
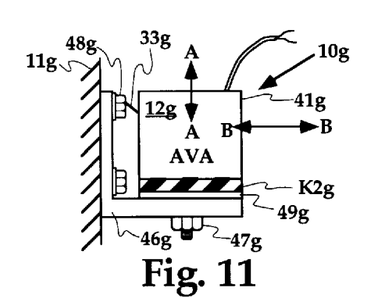
FIG. 11 is a side view of a flexibly-mounted active vibration absorber system where the first spring is comprised of a single sandwich-type elastomer compression element.

FIG. 11 illustrates another embodiment of active device 10g for use in an active system wherein the first spring K2g includes an elastomer compression sandwich-type member which is preferably placed in substantially pure compression upon activation of the AVA 12g along the axis A—A shown. Alternatively, actuation of AVA 12g along axis B—B will cause the first spring K2g to be loaded in substantially pure shear. Here, the first spring K2g is preferably bonded directly to the plate 49g and to a case 41g. Bracket 46g attaches by bolts 48g to the vibrating member 11g, and plate 49g attaches to bracket 46g by fastener 47g.

Figure 12:
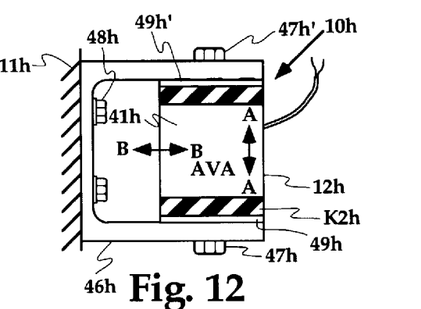
FIG. 12 is a side view of a flexibly-mounted active vibration absorber system where the first spring is comprised of multiple sandwich-type elastomer elements.

FIG. 12 illustrates another embodiment of active device 10h for use in an active system wherein the first spring K2h includes multiple elastomer sandwich-type members, each of which are placed in substantially pure compression upon activation of the AVA 12h along the axis A—A shown. Alternatively, activation of AVA 12h along axis B—B will cause the spring K2h to be loaded in substantially pure shear. Here, the first spring K2h is preferably bonded directly to the plates 49h and 49h' and to case 41h. Bracket 46h attaches by bolts 48h to the vibrating member 11h, and plates 49h and 49h' attach to bracket 46h by fasteners 47h and 47h'.

Figure 13:
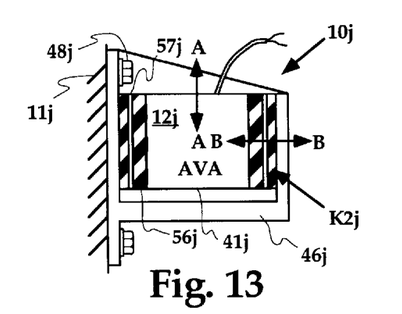
FIG. 13 is a side view of a flexibly-mounted active vibration absorber system where the first spring is comprised of alternating layers of elastomer and metal shims.

FIG. 13 illustrates another embodiment of active device 10j for use in an active system wherein the first spring K2j includes an elastomer member which includes laminated elastomer and shim construction, i.e., alternating layers of elastomer 56j bonded to metal shims 57j. Activation of the AVA 12j along the axis A—A shown, loads the elastomer layers 56j in substantially pure shear. Alternatively, activation of AVA 12j along axis B—B will cause the first spring K2j to be loaded in substantially pure compression. The first spring K2j is preferably bonded directly to the bracket 46j and to a case 41j, and bracket 46j attaches by bolts 48j to the vibrating member 11j.

Figure 14:
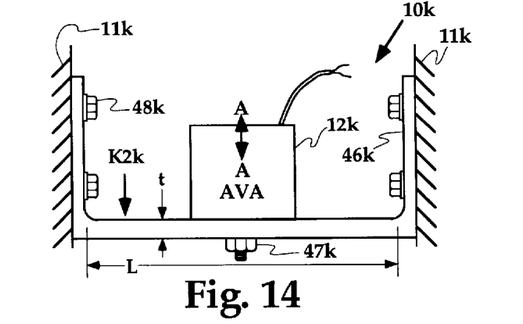
FIG. 14 is a side view of a flexibly-mounted active vibration absorber system where the first spring is comprised of a flexible beam spar K2t.

FIG. 14 illustrates another embodiment of active device 10k for use in an active system wherein the first spring K2k is a flexible beam spar which is manufactured from a spring-steel material and which is placed in bending upon activation of the AVA 12k along the axis A—A shown. The first spring K2k includes an effective length L, thickness t, and width (not shown) for providing a designed bending stiffness. The flexible beam spar, i.e., the first spring K2k, includes a first end for attachment to the vibrating member 11k and a second end which is also connected to the vibrating member 11k, and having a center portion therebetween. Bracket 46k attaches by bolts 48k to the vibrating member 11k and AVA 12k attaches by fastener 47k to flexible beam spar K2k at the center portion thereof. Adjusting the length, modulus, thickness and width of the beam section L of first spring K2k can be used to shape the response of the AVA 12k.

Figure 15:
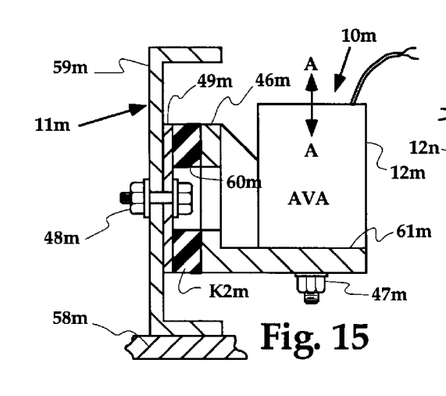
FIG. 15 is a partially cross-sectioned side view of a flexibly-mounted active vibration absorber system where the first spring is bonded to a base plate and bracket assembly for attaching to a stiffening member of an aircraft fuselage.

FIG. 15 illustrates an embodiment of the device 10m for an active system shown attached in the environment of an aircraft stiffening member 59m wherein the stiffening member 59m generally stiffens an aircraft fuselage 58m. The device 10m is comprised of a first plate 49m for abutting and directly attaching to the stiffening member 59m by fastener 48m, which in this case is the vibrating member 11m, a rigid L-shaped bracket 46m having a bond receiving surface 60m and a platform 61m formed perpendicular to said bond receiving surface 60m, a shear elastomer section K2m which is bonded between said bond receiving surface 60m and said first plate 49m. The AVA 12m is fastened to the platform 61m of the rigid L-shaped bracket 46m by fastener 47m. The AVA 12m when activated generates force in a direction along axis A—A. This tends to control localized motion at the point of attachment or may be used to locally drive the system to cancel noise or vibration elsewhere.

Figure 16:
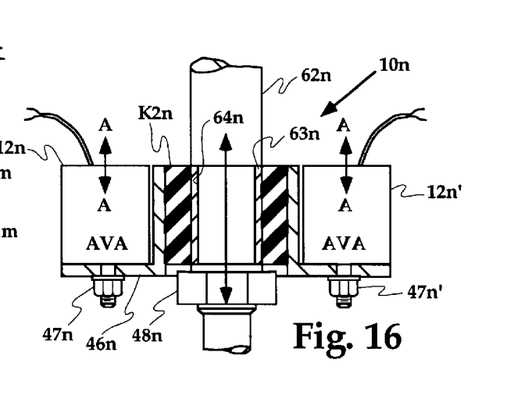
FIG. 16 is a partially cross-sectioned side view of a flexibly-mounted active vibration absorber system where the first spring is comprised an elastomer tubeform-type section attached to a vibrating rod-like linkage element such as a transmission linkage in a helicopter.

FIG. 16 illustrates an embodiment of the active device 10n for an active system shown attached in the environment of a rod-like linkage 62n such as a transmission link attached between a helicopter fuselage and transmission. The device 10n is comprised of multiple AVAs 12n and 12n' which attach to bracket 46n by fasteners 47n and 47n'. The bracket 46n attaches to rod-like linkage 62n by first spring K2n, in this case, a tubeform-type elastomer section bonded between the bracket 46n and sleeve 63n. Sleeve 63n and device 10n slide over outer diameter 64n of rod-like linkage 62n and is secured in place by fastener 48n. Activation of the AVAs 12n and 12n' along their respective axes A—A reduces vibration transmitted along the axis of the rod-like linkage 62n.

Figure 17:
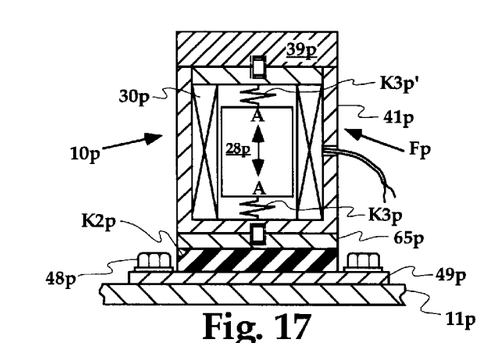
FIG. 17 is a partially cross-sectioned side view of a flexibly-mounted active vibration absorber system where the active actuator is comprised of a coil and permanent magnet.

FIG. 17 illustrates an active device 10p for use in an active system illustrating an actuator Fp that is of the voice-coil type, and where the first spring K2p is a separate unit including a first plate 49p and a second plate 65p, said second plate 65p having a threaded hole formed therein. The first spring K2p is preferably bonded to both first plate 49p and second plate 65p. The actuator Fp attaches to second plate 65p by a stud inserted in threaded hole. The device 10p may also include an auxiliary mass 39p for attachment to case 41p in a similar manner. The actuator Fp is preferably made up of magnet 28p, coil 30p and second springs K3p and K3p'. The device 10p preferably attaches to vibrating member 11p by fasteners 48p. Such devices are desirable for actuation at frequencies of between about 10 Hz and 1000 Hz.

Figure 18:
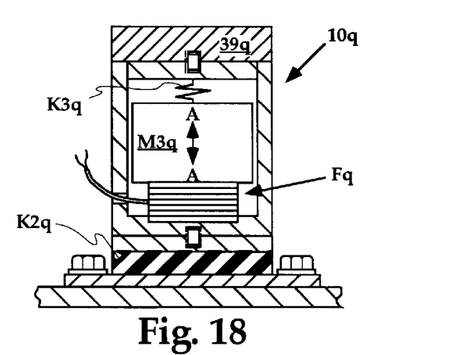
FIG. 18 is a partially cross-sectioned side view of a flexibly-mounted active vibration absorber system where the active actuator is comprised of a stacked piezoelectric element.

FIG. 18 illustrates another active device 10q for use in an active system illustrating an actuator Fq that is a piezoelectric type. The first spring K2q is a separate unit as in the previous embodiment. The actuator Fq is preferably made up of multiple stacked layers of piezoelectric material. Likewise, an auxiliary mass 39q may be added for shaping the output. The second spring K3q acts to precompress the piezoelectric stack as well as to contribute to the resonant frequency of mass M3q. Such devices are desired for actuation at higher frequencies such as between about 300 Hz and 3000 Hz.

Figure 19A:
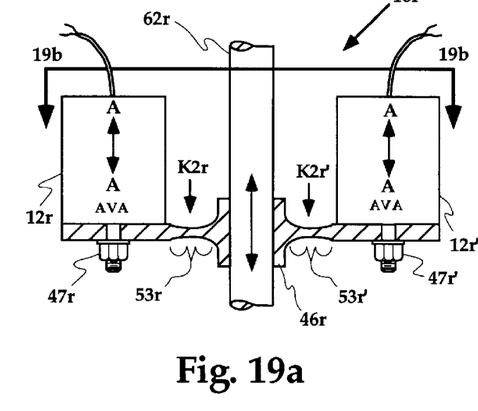
FIG. 19a is a partially cross-sectioned side view of a flexibly-mounted active vibration absorber system which includes a bracket assembly with multiple cantilevered spring-steel beam elements for attachment to a rod-like linkage member.
Figure 19B:
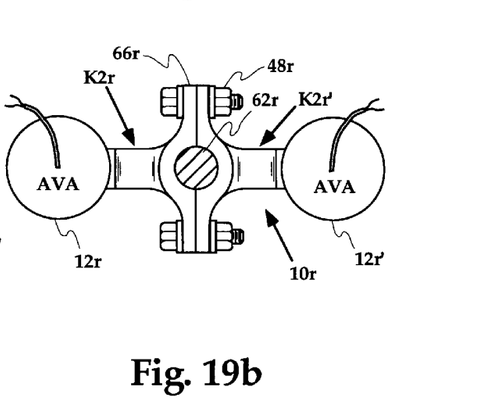

FIG. 19a and FIG. 19b illustrate another embodiment of the active device 10r for use with active system shown attached in the environment of a rod-like linkage 62r such as a transmission link for attachment between a helicopter fuselage and transmission. The device 10r is comprised of multiple AVAs 12r and 12r' which attach to bracket 46r by fasteners 47r and 47r'. The bracket 46r clamps to rod-like linkage 62r. The first springs K2r and K2r' are cantilevered beam elements manufactured from a spring-steel material and the spring rate of each is provided by necked-down sections 53r and 53r'. Bracket 46r securely clamps to rod-like linkage 62r by fasteners 48r inserted through tangs 66r. Activation of the AVAs 12r and 12r' along axis A—A controls vibration transmitted along rod-like linkage 62r.

Figure 20:
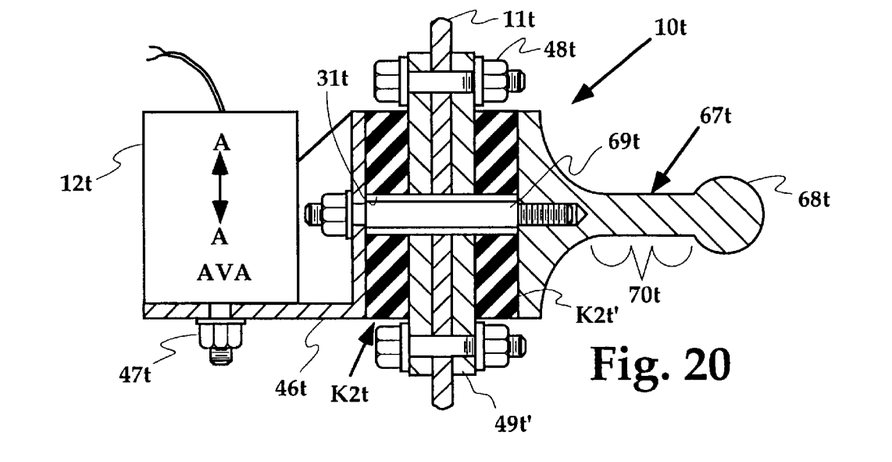
FIG. 20 is a partially cross-sectioned side view of a flexibly-mounted active vibration absorber system where torque imparted to the vibrating member by the active vibration absorber is at least partially counteracted by a counterbalancing mass.

FIG. 20 illustrates another embodiment of active device 10t for use in an active system. The device 10t is similar to that described in the FIG. 15 embodiment, except the device 10t includes means 67t for counterbalancing which reduces dynamic moments applied to the vibrating member 11t at a frequency of interest resulting from activation of the AVA 12t along axis A—A. The device 10t includes a counterbalance mass 68t which attaches at a point on the opposite side of the attachment point of the device 10t to the vibrating member 11t. In this embodiment, the counterbalance means 67t includes a portion of first spring K2t represented as K2t'. Portions of first spring K2t, K2t' are bonded to plate 49t' and counterbalance mass 68t. A cross-connector 69t rigidly connects the bracket 46t to the counterbalance mass 68t such that they move in unison. Movement may be limited by space 31t. Counterbalance mass 68t as shown is, in itself, may be a passive TVA having a resonant frequency resulting from tuning of the length, stiffness and dimensions of beam portion 70t. It should be noted, that the rotational stiffness of the counterbalance means 67t should be as high as possible such that rotational resonances are placed far beyond the disturbance frequency. Furthermore, it is generally desirable to have the rotary inertia I of the counterbalance high such that the added weight as a result of the counterbalance mass 68t is minimized. In this embodiment, the bulbous portion of counterbalance mass 68t should be as far away from the vibrating member as possible to accomplish this high I.

Figure 21:
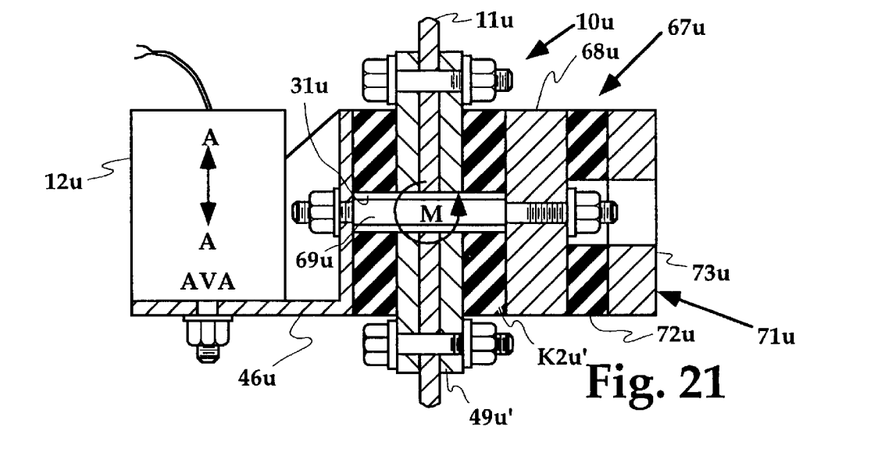
FIG. 21 is a partially cross-sectioned side view of a flexibly-mounted active vibration absorber system where torque imparted to the vibrating element by the active vibration absorber is at least partially counteracted by a passive Tuned Vibration Absorber (TVA)

FIG. 21 illustrates another embodiment of active device 10u for use in an active system. The device 10u is similar to that described in the FIG. 20 embodiment, except the device 10u includes means 67u for counterbalancing which is a passive elastomer TVA 71u. The passive TVA 71u attaches at a point on the opposite side of the attachment point of the device 10u to the vibrating member 11u. In this embodiment, the counterbalance means 67u includes a portion of first spring K2u' bonded to plate 49u' and to counterbalance mass 68u. Cross-connector 69u rigidly connects the bracket 46u to the counterbalance mass 68u such that they move in unison. Passive TVA 71u includes a TVA mass 73u and an elastomer section 72u which is preferably bonded to both mass 68u and the TVA mass 73u. Passive TVA 71u may be tuned to provide passive counterbalancing at some operating frequencies.

Figure 22:
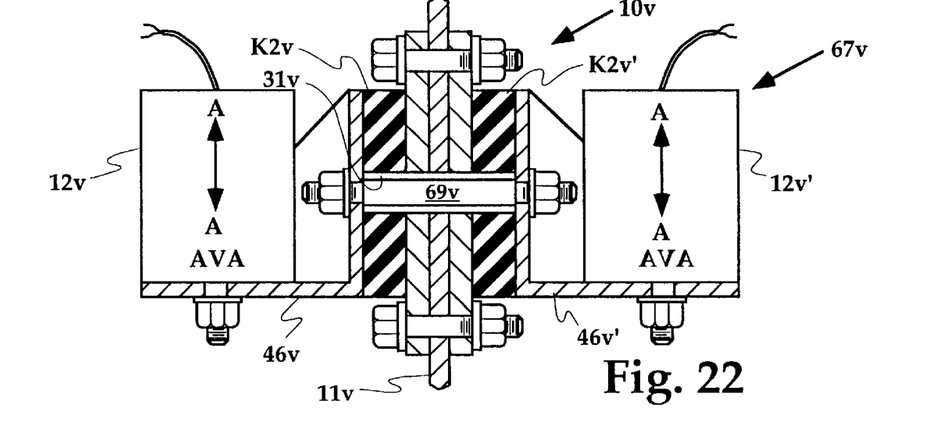
FIG. 22 is a partially cross-sectioned side view of a flexibly-mounted active vibration absorber system where a second flexibly-mounted AVA comprises a counterbalancing means.

FIG. 22 illustrates another embodiment of active device 10v for use in an active system. The device 10v is similar to that described in the FIG. 21 embodiment, except the device 10v includes means 67v for counterbalancing which is an AVA 12v'. The AVA 12v' attaches at a point on the opposite side of the attachment point of the device 10v to the vibrating member 11v. Preferably, AVA 12v' and AVA 12v are electrically wired together such that the AVAs provide no moments to the vibrating member 11v when operating as a collective unit, thus the second AVA 12v' acts as the means 67v for counterbalancing the moments applied by the first AVA 12v.

Figure 23:
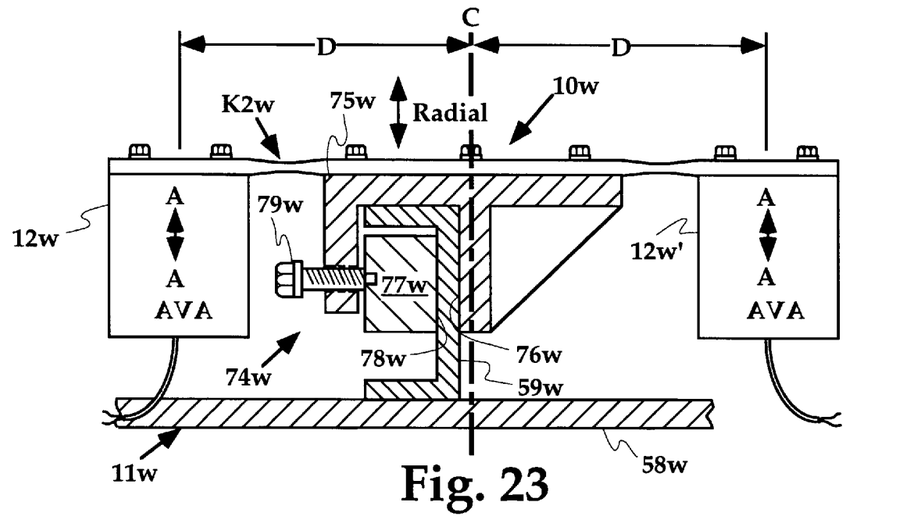
FIG. 23 is a partially cross-sectional side view of a flexibly-mounted active vibration absorber system including multiple AVAs attached to a flexible beam and where the beam attaches to a stiffening member by a clamping bracket and each AVA is an equal distance from the shear center of the stiffening member.

FIG. 23 illustrates another embodiment of active device 10w for use in an active system. In this embodiment, the device low attaches to an aircraft stiffening member 59w. The stiffening member 59w functions to stiffen fuselage 58w. Clamping assembly 74w attaches the device 10w to the stiffening member 59w. The device 10w is comprised of AVAs 12w and 12w' which attach to first spring K2w, which in this case is a cantilevered beam. The cantilevered beam K2w is also attached to stiffening member 59w by clamping assembly 74w. Clamping assembly 74w preferably includes a body portion 75w which is preferably C-shaped having a first clamp surface 76w, a block 77w having a second clamp surface 78w, and an adjustment 79w for advancing the block 77w such that surfaces 78w and 76w grip a portion of the stiffening member 59w and fix the device 10w securely in place. Activation of the AVAs 12w and 12w' along respective axes A—A causes generation of forces which may either, reduce the motion of, or positively drive, the stiffening member 59w in the radial direction. It should be noted that the use of a second AVA 12w' acts as the means for counterbalancing the moments applied to the stiffening member 59w by first AVA 12w. In this embodiment, AVAs 12w and 12w' are located an equal distance D from the shear center C of the stiffening member 59w. The shear center C is the point where loads should be applied in order not to bend (apply moments) the stiffening member. By placing the AVAs 12w and 12w' an equal distance from the shear center C, substantially no moments will be applied to the stiffening member 59w.

Figure 24:
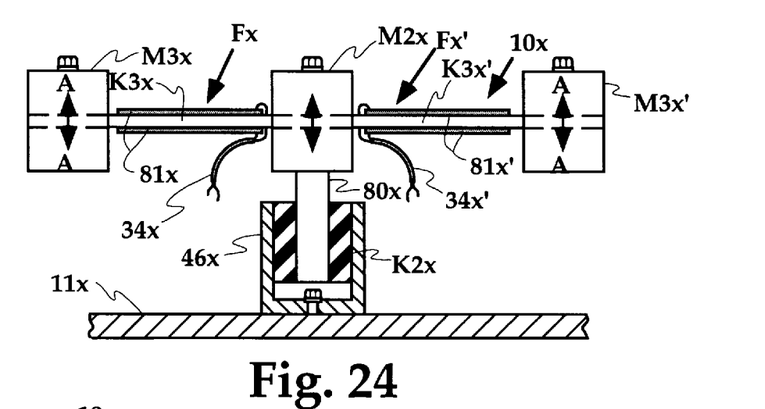
FIG. 24 is a partial cross-sectional side view of a flexibly-mounted active vibration absorber system including multiple masses attached to flexible beams and where the flexible beams include piezoelectric strips adhered thereto for functioning as actuators.

FIG. 24 illustrates another embodiment of the device 10x for use in an active system which includes first spring K2x which flexibly attaches to first free-floating mass M2x. Cantilevered beam springs make up the second springs K3x and K3x' which have second masses M3x and M3x' attached at their terminal ends. The actuator Fx in this embodiment is comprised of piezoelectric strips 81x and 81x'. Providing an alternating current to the strips 81x and 81x' through conduits 34x and 34x' causes extension and contraction of the piezoelectric strips 81x and 81x' causing the masses M3x and M3x' to oscillate. Second spring K2x is bonded to mass M2x via pilot 80x and also to bracket 46x which attaches to vibrating member 11x. Proper tuning of the beams and masses will allow the AVA to be more effective. Further, the use of a second spring K3x' second actuator Fx', and second free-floating mass M3x' acts as the means for counterbalancing the moments applied by the first AVA comprising the second free-floating mass M3x, the second spring K3x, and the actuator Fx.

Figure 25:
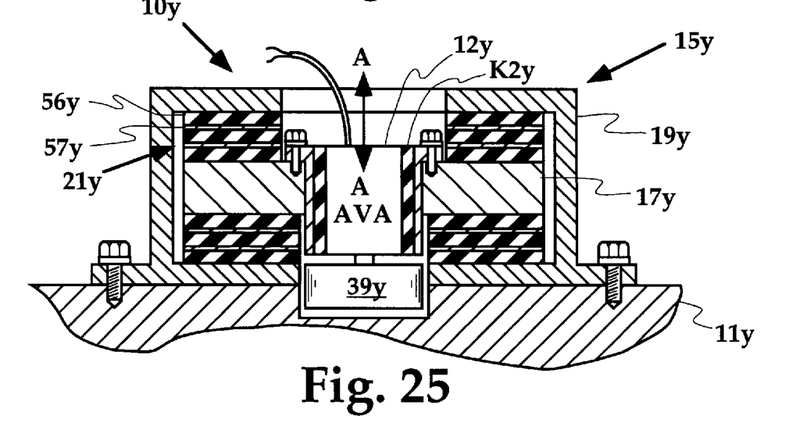
FIG. 25 is a partial cross-sectional side view of a flexibly-mounted active vibration absorber system attached to the inner member of a passive elastomer mount.

FIG. 25 illustrates another embodiment of the device 10y for use in an active system wherein first spring K2y flexibly attaches AVA 12y to the inner member 17y of passive mount 15y. Passive mount 15y is preferably elastomeric and includes an inner member 17y, outer member 19y, and flexible member 21y which is preferably manufactured from laminated elastomer 56y and metal shim 57y construction, where the elastomer 56y is natural rubber, synthetic rubber or the like and flexibly interconnects the inner member 17y and outer member 19y to allow relative motion therebetween. Outer member 19y attaches to vibrating member 11y. AVA 12y preferably includes auxiliary mass 39y. Activating the flexibly mounted AVA 12y along axis A—A causes a reduction in the vibration of the inner member 17y. The inner member 17y attaches to the structure (not shown), therefore, a reduction of the vibration of the inner member 17y results in a reduction of vibration of the structure as well. The first spring K2y is a tubeform-type elastomer section in this embodiment and has an annular sleeve-like shape. The AVA 12y is preferably received in a pocket formed in the inner member 17y.

Figure 26:
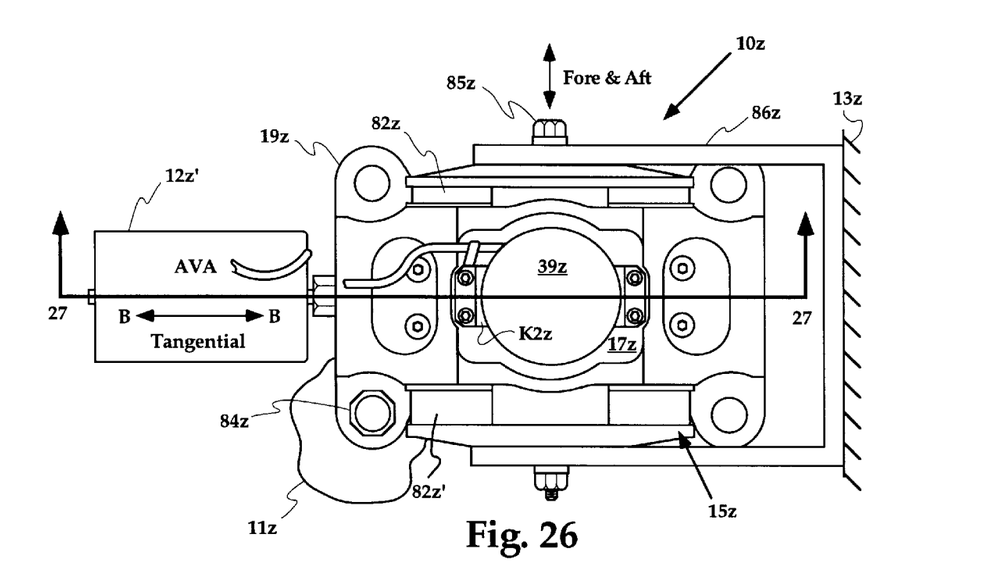
FIG. 26 is a top view of a flexibly-mounted active vibration absorber system including an AVA attached to an inner member of a passive mount by a flexible spring-steel element.
Figure 27:
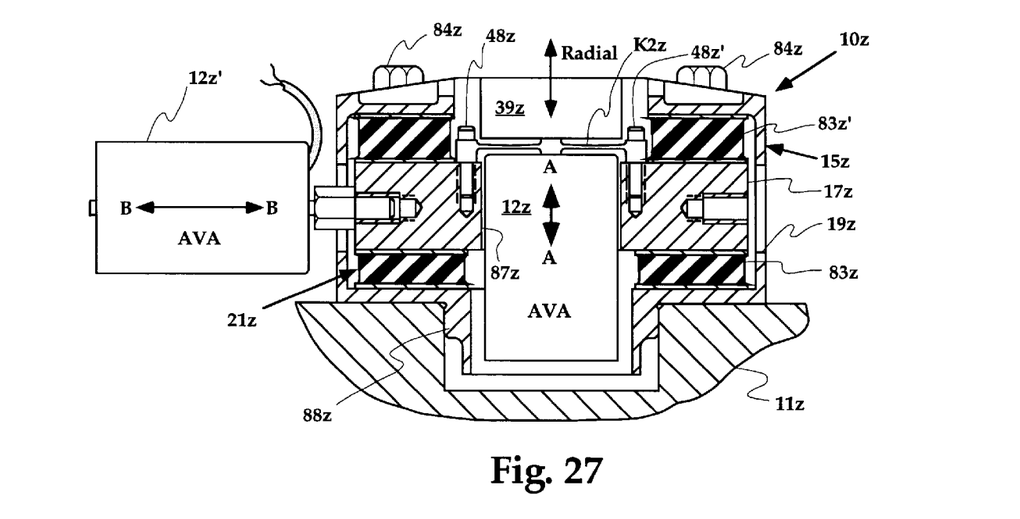
FIG. 27 is a partial cross-sectional side view of the flexibly-mounted active vibration absorber shown in FIG. 26.

FIG. 26 and FIG. 27 illustrate an active device 10z for use in an active isolation system, in particular, this embodiment is an active mount which includes a passive mount 15z with an AVA 12z flexibly attached to the inner member 17z of passive mount 15z by a first spring K2z. The passive mount 15z includes an outer member 19z, inner member 17z, and a flexible member 21z providing a flexible interconnection between the inner member 17z and the outer member 19z and allowing relative motion therebetween. In detail, the passive mount 15z includes fore and aft elements 82z and 82z' and radial elements 83z and 83z'. Bolts 84z attach the outer member 19z to the vibrating member 11z, which may be an aircraft engine or the like. Only one bolt is shown in FIG. 26, for clarity.

Through bolt 85z attaches the inner member 17z to the structure 13z via clevis 86z. The first spring K2z is a flexible beam-like member manufactured from a spring-steel material and is attached to the inner member 17z by hex bolts 48z and 48z'. The AVA 12z is interconnected to, and freely suspended by, the first spring K2z relative to the inner member 17z. The AVA 12z is preferably received through a bore 87z formed through the inner member 17z. Preferably, the body of the AVA 12z is also recessed in the pilot portion 88z formed in the outer member 19z. This shrouds the AVA 12z and keeps the AVA sheltered from any possible destructive contact. Auxiliary mass 39z may be added to allow tuning and shaping the output of the AVA 12z.

The AVA shown in FIG. 6a illustrates one embodiment of AVA which may be used in this active mount. Actively actuating the AVA 12z provides vibrational inputs to the inner member 17z along the radial axis to reduce vibration transmitted to structure. A second AVA 12z' may be added to provide active forces in a second direction perpendicular to the line of action of the AVA 12z. The second AVA 12z' may also be flexibly mounted, although shown hard mounted to the inner member 17z. Threaded inserts are shown on either end of the inner member 17z such that AVA 12z' may attach at either end thereof.

Various changes, alternatives and modifications will become apparent to one of ordinary skill in the art following a reading of the foregoing specification. In addition, while the tuned vibration absorber has been described as reducing or eliminating the amplitude of motion of a vibrating member, it will be appreciated that it can be also be used to control vibration transmission to the support structure and/or reduce noise at another location. It is intended that all such changes, alternatives, and modifications come within the scope of the appended claims be considered part of the present invention.

What is claimed is:

1. An active system including an Active Vibration Absorber (AVA) for interconnection to a vibrating member to control a level of one from a group of vibration and noise at a predefined location by actuation of said AVA, said active system comprising:

(a) a first spring K2 for attaching to said vibrating member;

(b) an AVA interconnected to, and flexibly suspended by said first spring K2 relative to said vibrating member, said first spring K2 shaping the output spectrum of said AVA, said AVA including:

a first free-floating, tuned mass M2 attached to said first spring K2;

ii) a second free-floating, tuned mass M3 adjacent said first free-floating mass M2;

iii) a second spring K3 interconnected between said first free-floating mass M2 and said second free-floating mass M3; and iv) actuator means F operating between said first free-floating mass M2 and said second free-floating mass M3 and in parallel relationship to said second spring K3 to provide active real-time forces to actively oscillate said second free-floating mass M3 relative to said first free-floating mass M2; and (c) means for controlling said actuator means F to oscillate both said first free-floating mass M2 and said second free-floating mass M3 relative to said vibrating member at a frequency corresponding to a vibration frequency of said vibrating member causing said vibrating member to undergo a change in vibration thereby reducing one from the group consisting of said noise and said vibration at said predefined location.

2. An active system of claim 1 wherein said first spring K2 is comprised of multiple spring-steel beam-like elements extending radially and perpendicularly outward from an axis of a shaft interconnected to said actuator means F.

3. An active system of claim 2 wherein each said multiple spring-steel beam-like element includes a necked-down portion formed therein for providing a defined bending stiffness.

4. An active system of claim 1 wherein said first spring K2 is one from the group consisting of multiple stacked belleville washers, an elastomeric shear element, an elastomeric sandwich-type element, and an elastomeric tubeform-type element.

5. An active system of claim 1 wherein said first spring K2 is comprised of a cantilever beam manufactured from a spring-steel material having an effective length L, a first end for attachment to said vibrating member and a second terminal end, said AVA being fastened to said cantilever beam near said terminal end.

6. An active system of claim 1 wherein said first spring K2 is comprised of multiple elastomeric sandwich-type elements operated in substantially pure compression.

7. An active system of claim 1 wherein said first spring K2 is further comprised of laminated elastomer and metal shim construction and includes a shear element which is operated in substantially pure shear.

8. An active system of claim 1 wherein said first spring K2 is comprised of a flexible beam spar manufactured from a spring-steel material having an effective length L and a defined stiffness, a first end for connection to said vibrating member and a second end for also connecting to said vibrating member, and a center portion therebetween, said AVA being directly fastened to said beam spar near said center portion.

9. An active system of claim 1 wherein said first spring K2 is comprised of a first plate for direct attachment to said vibrating member, a rigid L-shaped bracket having a bond receiving surface and a platform formed perpendicular to said bond receiving surface, a shear elastomer section bonded between said bond receiving surface of said rigid L-Shaped bracket and said first plate, said AVA being fastened to said platform of said rigid L-shaped bracket.

10. An active system of claim 9 wherein said vibrating member is a stiffening member for stiffening an aircraft fuselage.

11. An active system of claim 1 wherein said first spring K2 is attached to a bracket, and wherein a second AVA also attaches to a bracket, and said vibrating member is a rod-like linkage having a defined axis and wherein said AVAs are activated along said defined axis.

12. An active system of claim 11 wherein said first spring K2 is one from the group consisting of a tubeform-type elastomer section and a cantilever beam element manufactured from spring-steel and said first spring K2 is attached to said rod-like linkage by said bracket, and said rod-like linkage attaches between a helicopter transmission and a helicopter fuselage.

13. An active system of claim 1 wherein said actuator means is one selected from the group consisting of an electromagnetic actuator, a voice-coil type actuator, a magnetostrictive actuator, and a piezoelectric actuator.

14. An active system of claim 1 wherein said AVA is attached to said vibrating member and counterbalanced to reduce moments applied to said vibrating member by one of a counterbalance mass, a passive tuned vibration absorber, and an AVA.

15. An active system of claim 1 wherein said AVA is attached to an inner member of an elastomer mount, said elastomer mount including said inner member, an outer member, and an elastomer section connected therebetween.

16. An active system of claim 1 wherein said vibrating member is a portion of an aircraft fuselage and wherein said first spring K2 is a cantilevered beam, said cantilevered beam being attached to a stiffening member of said aircraft fuselage by an assembly, said stiffening member exhibiting a shear center, said cantilevered beam being fastened to said assembly and said AVA being fastened to said cantilevered beam and said AVA being attached to said cantilevered beam on one side of said assembly and a second AVA being attached on another side of said assembly and said AVA and said second AVA being attached substantially equal distant from said shear center.

17. An active system of claim 1 wherein said first spring is an elastomer element, and said second free-floating mass is attached to an end of a cantilever beam and said actuator means is a piezoelectric strip.

18. A device for controlling vibration of a vibrating member, comprising:
   (a) a first spring attached to said vibrating member;
   (b) an Active Vibration Absorber (AVA) interconnected to, and freely suspended by said first spring, said first spring exhibiting characteristics that shape the output spectrum of said AVA, said AVA including:
      i) a first free-floating, tuned mass attached to said first spring;
      ii) a second free-floating, tuned mass adjacent said first free-floating mass;
      iii) a second spring interconnected between said first free-floating mass and said second free-floating mass; and
      iv) actuator means operating between said first free-floating mass and said second free-floating mass to provide active real-time assisting forces to actively oscillate said first free-floating mass relative to said second free-floating mass and oscillate both said first free-floating mass M2 and said second free-floating mass M3 relative to said vibrating member at a frequency corresponding to a vibration frequency of said vibrating member causing said vibrating member to undergo a change in vibration thereby reducing one from a group consisting of noise and vibration; and
   (c) means for counterbalancing said active real-time forces such that moments applied to said vibrating member are minimized.

19. An active system of claim 18 wherein said counterbalancing is accomplished by one of an adjacent AVA, a passive TVA and a counterbalancing mass.

20. An active device for attachment to a vibrating element, comprising:
   (a) an elastomer mounting, including:
      i) an inner member,
      ii) an outer member,
      iii) a flexible section providing a flexible interconnection between said inner member and said outer member and allowing relative motion therebetween,
   (b) a first spring K2 attached to said inner member; and
   (c) an Active Vibration Absorber (AVA) interconnected to, and freely suspended by said first spring K2 relative to said inner member, said AVA including:
      i) a first free-floating, tuned mass M2 attached to said first spring K2;
      ii) a second free-floating, tuned mass M3 adjacent said first free-floating mass M2; and
      iii) a second spring K3 interconnected between said first free-floating mass M2 and said second free-floating mass M3; and
      iv) actuator means operating between said first free-floating mass M2 and said second free-floating mass M3 to provide active real-time forces to actively oscillate said second free-floating mass M3 relative to said first free-floating mass M2 and to oscillate both said first free-floating mass M2 and said second free-floating mass M3 relative to said inner member at a frequency corresponding to a vibration frequency of said inner member causing said inner member to undergo a change in vibration thereby reducing one from a group consisting of said noise and said vibration.

21. An active device of claim 20 further including a second AVA also attached to said inner member for providing real-time forces in a direction substantially perpendicular to said first axis.

22. A device for controlling vibration, comprising:
   (a) a first spring for providing an attachment to a vibrating member; and
   (b) an Active Vibration Absorber (AVA) interconnected to, and freely suspended by said first spring, said AVA including:

i) a first free-floating, tuned mass attached to said first spring;

ii) a second free-floating, tuned mass adjacent said first free-floating mass;

iii) a second spring interconnected between said first free-floating mass and said second free-floating mass; and iv) actuator means operating between said first free-floating mass and said second free-floating mass to provide active real-time forces to actively oscillate said first free-floating mass relative to said second free-floating mass and oscillate both said first free-floating mass M2 and said second free-floating mass M3 relative to said vibrating member at a frequency corresponding to a vibration frequency of said vibrating member causing said vibrating member to undergo a change in vibration thereby reducing one from a group consisting of said noise and vibration.

23. A device of claim 22 wherein said AVA is attached to an inner member of an elastomer mount.

24. A device of claim 22 wherein said device includes means for counterbalancing said active real-time forces such that moments applied to said vibrating member are minimized.

25. A device of claim 22 wherein said first spring is comprised of multiple spring-steel beam-like elements extending radially and perpendicularly outward from an axis of a shaft formed on said actuator means and where said first mass includes a detachable auxiliary mass.

26. An active tuned vibration absorber for use in reducing a level of vibration transmitted from a vibrating member to a support structure, said vibrating member being connected to said support structure by means of a passive mount which includes an inner member, said active tuned vibration absorber comprising:

a) a spring for attachment to one member selected from a group consisting of said vibrating member and said support structure, wherein said spring attaches to said inner member of said passive mount;

b) a first free-floating mass suspended by said spring;

c) a second free-floating mass suspended relative to said first mass;

d) active actuation means interactive with said first free-floating mass to actively oscillate said second free-floating mass relative to said first free-floating mass and osicillate both said first free-floating mass M2 and said second free-floating mass M3 relative to one of said vibrating member and said support structure at a frequency corresponding to a vibration frequency of one of said vibrating member and said support structure causing one of said vibrating member and said support structure to undergo a change in vibration thereby reducing one from the group consisting of said noise and vibration;

e) sensor means for providing a signal indicative of the condition of the system; and f) controller means for controlling said active actuation means responsive to said sensor means to control transmission of vibration from said vibrating member to said support structure.

27. An active tuned vibration absorber for use in reducing a level of vibration transmitted from a vibrating member to a support structure, said vibrating member being connected to said support structure by means of a passive mount which includes an inner member which forms part of one of said vibrating member and said support structure and an outer member which forms part of the other of said vibrating member and said support structure, and a flexible element interconnecting said inner member and said outer member, said active tuned vibration absorber comprising:

a) a spring for attachment to one of a group consisting of said inner member and said outer member of said passive mount;

b) a first absorber mass attached to said spring and freely movable relative to said one of said inner member and said outer member;

c) a second absorber mass freely movable relative to, and suspended from, said first absorber mass;

d) active actuation means interactive with said second absorber mass to actively oscillate said second mass relative to said first mass and oscillate both said first free-floating mass M2 and said second free-floating mass M3 relative to said one of said inner member and said outer member at a frequency corresponding to a vibration frequency of said one of said inner member and said outer member causing said one of said inner member and said outer member to undergo a change in vibration, thereby controlling vibration of one of said inner member and said outer member;

e) sensor means for deriving a signal indicative of the condition of at least one of a group consisting of said first absorber mass, said second absorber mass, said inner member, and said outer member; and f) a controller responsive to said sensor means for sending a control signal to said actuation means for controlling vibration.

* * * * *